United States Patent [19]

Penfield, Jr.

[11] 4,287,022

[45] Sep. 1, 1981

[54] COMPRESSION HUB FOR A FUSION REACTOR SYSTEM

[75] Inventor: Scott R. Penfield, Jr., Carlsbad, Calif.

[73] Assignee: Combustion Engineering, Inc., Windsor, Conn.

[21] Appl. No.: 47

[22] Filed: Jan. 2, 1979

[51] Int. Cl.³ .................................................. G21B 1/00
[52] U.S. Cl. ........................................ 176/3; 335/216; 336/199
[58] Field of Search ............. 176/3; 336/199, DIG. 1; 335/216

[56] References Cited

U.S. PATENT DOCUMENTS

| | | | |
|---|---|---|---|
| 3,736,539 | 5/1973 | File et al. | 176/3 |
| 4,174,254 | 11/1979 | Gaines | 176/3 |

OTHER PUBLICATIONS

IEEE Pub. No. 75 CH 1097-5NPS, Nov. 1975, pp. 470-473.

Primary Examiner—Harvey E. Behrend
Attorney, Agent, or Firm—Arthur E. Fournier, Jr.

[57] ABSTRACT

A compression hub for use in a fusion reactor system comprising a multiplicity of compression plates that are polygonal in configuration, and which are arranged in vertically stacked, spaced relation relative to each other. Each of the compression plates has rabbet means formed therein operable for receiving beam means in supported relation thereto. Securing means are provided for securing the beams in place relative to the rabbet means. The beam means are employable for purposes of effecting the interconnection of a plurality of magnet means to the compression hub. Each of the compression plates is also provided with fluid flow means. The fluid flow means of the compression plates cooperate with one another to establish a fluid flow path for coolant through the compression hub. The compression plates are interconnected together along their respective perimeters by seal plate means so as to form a closed, fluid tight structure.

10 Claims, 5 Drawing Figures

FIG. 5

COMPRESSION HUB FOR A FUSION REACTOR SYSTEM

BACKGROUND OF THE INVENTION

1. Field of the Invention

This invention relates to fusion reactor systems, and more particularly, to a compression hub employable therein in cooperative association with a plurality of magnets.

2. Description of the Prior Art

One form of fusion reactor that has been proposed for use by the prior art is the so-called Tokamak-type reactor. In accordance with the mode of operation of this type of reactor, thermal power is generated as a consequence of the ignition of plasma. There exists, however, in this type of reactor not only a need to ignite the plasma, but also a need for effecting control levels to ignition.

One technique which has been proposed for use for purposes of effecting control over the plasma, is that of magnetic confinement. More specifically, it has been proposed to employ for this purpose a plurality of superconducting magnets operating at cryogenic temperatures. Through the use of such magnets, it is possible to attain intense magnetic fields of a strength sufficient to effect the desired confinement of the plasma.

To produce the desired result, the superconducting magnets are preferably arranged relative to each other so that they extend outwardly from a common point, in a manner similar to that of the spokes of a wheel. These magnets generate intense forces, tending to draw them together to the common point. Thus, there is a need created to provide means operative to resist the forces tending to draw the magnets together. One means contemplated for use for this purpose is a compression hub.

One form of a compression hub, which is suitable for use for the aforedescribed purpose, comprises the subject matter of Gaines patent application, Ser. No. 832,492, filed on Sept. 12, 1977, and assigned to the same assignee as the present invention. As discussed in the Gaines patent application, a compression hub in order to be suitable for use for the purpose described above must be susceptible to being cooled to the same relative temperature as the superconducting magnets, i.e., to cryogenic temperatures. In addition, this cooling of the compression hub must be capable of being accomplished while at the same time insuring that the structural adequacy of the compression hub is maintained.

Regarding the matter of cooling, as set forth in the afore-referenced Gaines application, the normal operating temperature range for the superconducting magnets is 4.2° to 4.9° kelvin. To achieve this range of temperatures, the magnets are preferably cooled by liquid helium, which boils at 4.2° kelvin at atmospheric pressure. Because of the criticality of the operating temperature, it is necessary that the compression hub, which is cooperatively associated with the superconducing magnets, be cooled also to the same temperature as the magnets. Otherwise, heat transfer in the form of a heat loss could take place between the compression hub and the magnets cooperatively associated therewith whereby the operating effectiveness of the magnets would be seriously impaired.

Not only is it necessary that the operating temperature of the compression hub be maintained at the same operating temperature as the superconducting magnets, but also it is important that the compression hub be capable of being cooled to the desired operating temperature of 4.2° kelvin in a relatively short period of time. One method of effecting the desired cooling of the compression hub is to depend on the cooling effect of the magnets to remove heat from the compression hub. However, this could take an inordinate amount of time to achieve, which would be totally unacceptable from the standpoint of how long it takes to render the system operative, particularly in a start-up situation. The reason for this, as discussed in the aforesaid Gaines patent application, is that at these very low temperatures the thermal gradient between the compression hub and the magnets cooperatively associated therewith is so small that virtually no cooling of the compression hub is effected. It, therefore becomes necessary to supply coolant to the compression hub itself. More specifically, fluid flow paths must be established for coolant in the compression hub. However, as noted previously hereinabove, the coolant flow paths in the compression hub must be provided in such a manner as to not adversely affect the structural adequacy of the compression hub, i.e., the ability of the compression hub to resist the forces tending to draw the magnets together to a common point.

In the aforementioned Gaines patent application, one form of compression hub, which fulfills the above stated requirements for a compression hub employable in a Tokamak-type fusion reactor system, has been described and illustrated. The present invention on the other hand, which constitutes the subject matter of the instant application, is directed to an alternative form of construction for a compression hub. It is contemplated that a compression hub constructed in accordance with the present invention would be employed in lieu of the compression hub described in the co-pending Gaines patent application.

OBJECTS OF THE INVENTION

It is therefore an object of the present invention to provide a novel and improved compression hub suitable for use in a fusion reactor system.

It is another object of the present invention to provide such a compression hub, which is capable of being cooperatively associated with the superconducting magnets that are employed in a fusion reactor for the purpose of effecting the magnetic confinement of plasma.

A further object of the present invention is to provide such a compression hub, which embodies sufficient structural strength as to be capable of resisting the intense forces that are produced by the superconducting magnets and that tend to draw the superconducting magnets together to a common point.

A still further object of the present invention is to provide such a compression hub, which is capable of being cooled to the same relative temperature as that of the superconducting magnets with which the compression hub is cooperatively associated thereby precluding the occurrence of any significant heat loss therebetween.

Yet another object of the present invention is to provide such a compression hub wherein the cooling thereof is effected while at the same time the structural adequacy thereof is maintained.

Yet still another object of the present invention is to provide such a compression hub, which is readily capable of being manufactured and assembled.

SUMMARY OF THE INVENTION

In accordance with a preferred form of the invention, there is provided a novel and improved compression hub that is capable of being cooperatively associated with the superconducting magnets employed in a fusion reactor system, particularly, a fusion reactor system of the Tokamak-type, and which is operative therein to offer resistance against the intense forces produced by the superconducting magnets that tend to draw the latter together to a common point. The compression hub includes a multiplicity of compression plates, each being polygonal in configuration. A suitably dimensioned rabbet is formed in each side wall of each of the multiplicity of compression plates. The multiplicity of compression plates are arranged in vertically stacked relation relative to each other whereby the rabbets formed therein are all aligned so as to effectively create a series of vertical rows thereof. The compression hub further includes beam means, the latter comprising a plurality of support beams corresponding in number to the number of vertical rows of rabbets. The support beams, each of which embodies a configuration complementary to that of the rabbets, are each secured in supported relation in a respective one of the vertical rows of rabbets. The support beams are suitably secured, such as by being welded thereto, to each of the multiplicity of compression plates in such a manner as to cause the compression plates to be supported in spaced relation relative to each other, whereby a suitably dimensioned space is established between each adjacent pair of compression plates. Vertically extending seal plates are positioned along the periphery of the compression plates and are secured thereto in a manner such that the seal plates cooperate with the support beams to provide the compression hub with a closed, fluid tight construction. Finally, the compression hub is provided with inlet means operable for use in supplying coolant to the compression hub, and fluid flow means operative to establish a fluid flow path through the compression hub for coolant.

The invention will be more fully understood from the detailed description and its scope will be pointed out in the appended claims.

DESCRIPTION OF A PREFERRED EMBODIMENT

Figure 1:
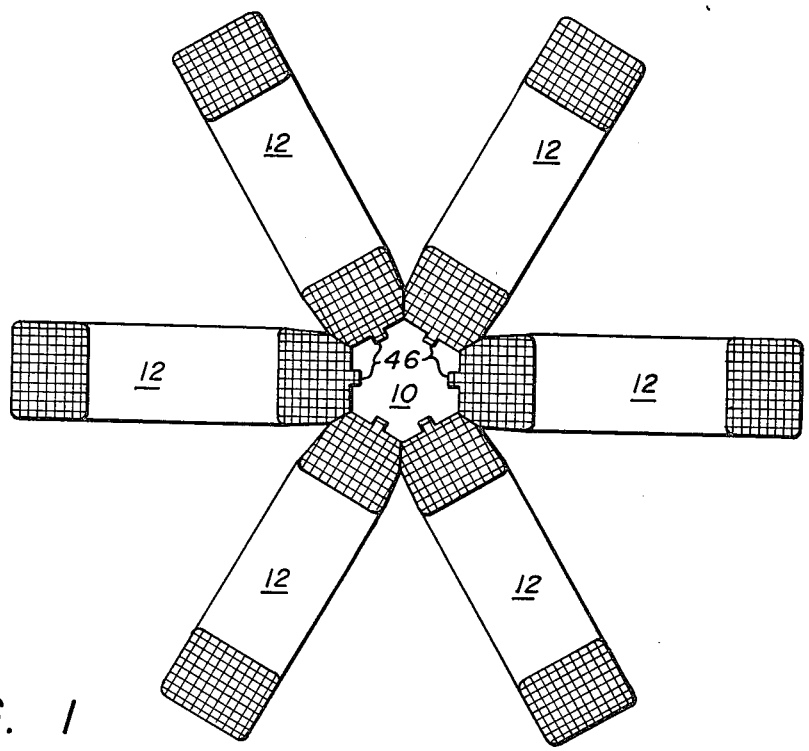
FIG. 1 is a plan view of a portion of a fusion reactor system, illustrating a compression hub constructed in accordance with the present invention cooperatively associated with a plurality of superconducting magnets.

Referring now to the drawing, and more particularly to FIG. 1 thereof, there is illustrated therein a portion of a fusion reactor system of the Tokomak-type. More specifically, there is depicted in FIG. 1 of the drawing, a compression hub, generally designated by reference numeral 10, constructed in accordance with the present invention. Cooperatively associated with the compression hub 10, as shown in FIG. 1, are a plurality of superconducting magnets 12. Inasmuch as all of the superconducting magnets 12 are of identical construction, it has been deemed appropriate to designate each of the magnets by means of the same reference numeral, i.e., 12. In accordance with the illustrated embodiment of the invention, the superconducting magnets 12 comprise six in number.

Although the compression hub 10 is intended to be employed in a Tokomak-type fusion reactor system, it is not deemed necessary for purposes of obtaining an understanding of the present invention that a complete description of the nature of the construction and the mode of operation of such a fusion reactor system be set forth herein and/or illustrated in the drawing. Rather, it is deemed sufficient to merely note herein that in accordance with the mode of operation of such a fusion reactor system, thermal power is generated as a consequence of the ignition of plasma. Moreover, there exists a need to effect confinement of the plasma. The latter function in turn is accomplished magnetically through the use of a plurality of superconducting magnets, such as the superconducting magnets 12 shown in FIG. 1 of the drawing. Namely, the magnets 12 are capable of generating intense magnetic fields of sufficient strength to achieve the desired confinement of the plasma.

In order to be operative for its intended purpose, there are basically two major functional requirements that the compression hub 10 must be capable of fulfilling. First, the compression hub 10 must be capable of successfully resisting the intense forces produced by the magnets 12 tending to draw the latter together towards a common point. Secondly, the compression hub 10 must be susceptible to being cooled to the same relative temperature as the superconducting magnets 12; namely, to a cryogenic temperature of approximately 4.2° kelvin. Moreover, the latter cooling of the compression hub 10 must be achieved without adversely affecting the structural strength thereof.

Figure 3:
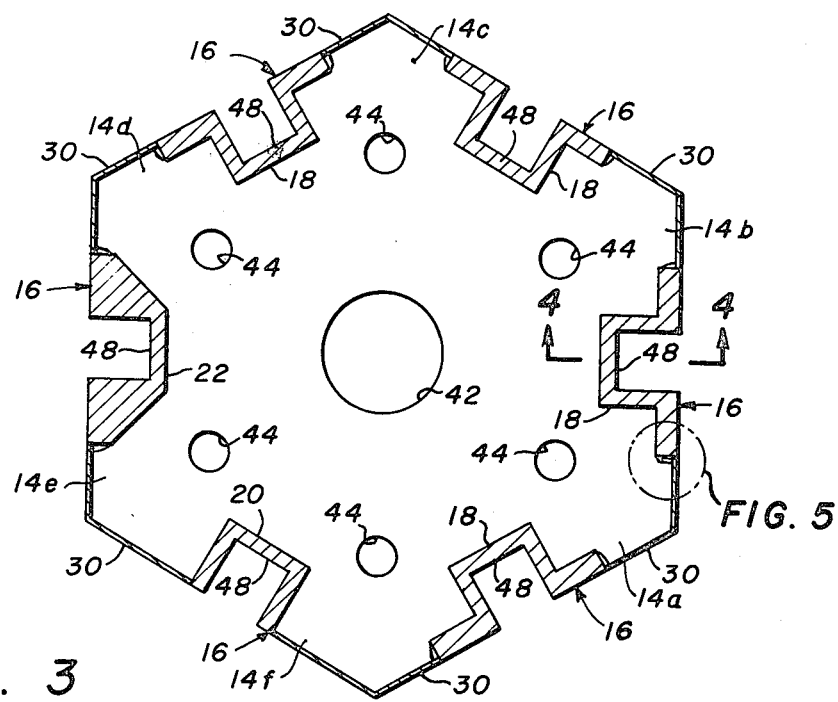
FIG. 3 is a cross-sectional view of the compression hub of FIG. 2 taken substantially along the line 3—3 in FIG. 2.
Figure 2:
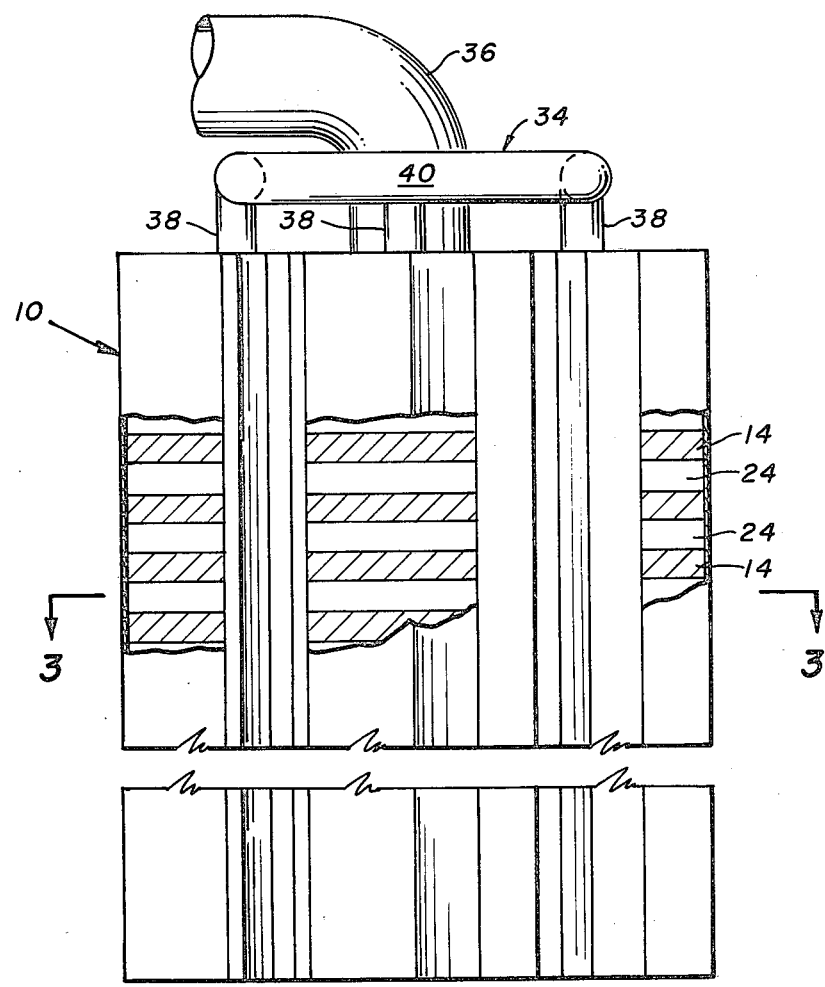
FIG. 2 is a side elevational view, with portions partially broken away, of a compression hub constructed in accordance with the present invention.

Proceeding now with a description of the nature of the construction of the compression hub 10, reference will be had for this purpose particularly to FIGS. 2 and 3 of the drawing. The compression hub 10, as best understood with reference to FIG. 2, includes a multiplicity of compression plates 14. Each of the compression plates 14 is polygonal in configuration. More specifically, in accordance with the preferred embodiment of the invention, each of the compression plates 14 has six equally dimensioned sides 14a, 14b, 14c, 14d, 14e, and 14f. Each of the latter sides 14a, 14b, 14c, 14d, 14e, and 14f is provided in turn with rabbet means. The latter rabbet means each consist of a rabbet, which is located substantially at the mid-point of each of the six sides 14a, 14b, 14c, 14d, 14e, and 14f of each compression plate 14, and which is suitably dimensioned so as to extend the thickness of the compression plate 14. In the interest of maintaining clarity of illustration in the drawing, designation of the aforedescribed rabbets by reference numeral in the drawing has been omitted.

Referring again to FIG. 2 of the drawing, as illustrated therein the multiplicity of compression plates 14 of the compression hub 10 are arranged in vertically stacked, spaced relation relative to each other in such a manner that the rabbets formed in the side walls 14a, 14b, 14c, 14d, 14e, and 14f of the compression plates 14 are all in vertical alignment so that there effectively exists a plurality of rows of vertically aligned rabbets. The rabbets are suitably configured so that a beam means, generally designated by reference numeral 16, is capable of being received in each vertical row of rabbets in supported relation thereto. In accordance with the preferred embodiment of the invention, the beam means 16 may take the form of any one of a plurality of suitably configured support beams. More specifically, the particular configuration embodied by the support beam is a function of the strength required thereof. Thus, as depicted in FIG. 3 of the drawing, the support beam may be configured as at 18, or the support beam may be configured as at 20, or the support beam may be configured as at 22, or the support beam may be configured in some other equally suitable shape. Although the compression plate 14 of FIG. 3 is depicted as having support beams of differing configurations, i.e., the support beam 18, the support beam 20, and the support beam 22, cooperatively associated therewith, it is to be understood that in actual practice only support beams embodying the same configuration would be utilized at any given time with the compression plates 14 of the compression hub 10. The compression plate 14 of FIG. 3 has been shown cooperatively associated with support beams embodying different configurations simply for the purpose of illustrating the fact that the specific configuration, which the support beams embody, is predicated upon the results of a structural analysis performed for the purpose of establishing the strength desired to be imparted to the compression hub 10 by the support beams. In accord with the illustrated embodiment of the invention, the number of beam means 16 employed in the compression hub 10 corresponds in number to the number of rabbet means with which the compression plates 14 are each provided; namely, six. Moreover, for a purpose which will be described more fully hereinafter, each of the support beams, irrespective of the configuration thereof, is preferably of integral construction so as to be of a length to extend the entire height of the compression hub 10 as viewed with reference to FIG. 3 of the drawing. Finally, note is taken of the fact that inasmuch as the beam means 16 is intended to be received in supported relation in the rabbet means, and inasmuch as the configuration of the support beams may vary, it is to be understood that the configuration of the rabbet means can also vary so as to be capable of accommodating therein the particular support beam selected for use in a given application. To summarize, the configurations of the rabbet means and the beam means 16 must be complementary in nature.

Continuing with a description of the nature of the construction of the compression hub 10, the support beams 18, 20 or 22, as the case may be, of the beam means 16 are suitably secured to each of the compression plates 14 so as to effectively cause the compression plates 14 to be supported in spaced relation relative to each other. More specifically, as will be best understood with reference to FIG. 2 of the drawing, a suitably dimensioned space, identified in FIG. 2, by reference numeral 24, is established between each pair of adjacent compression plates 14. Accordingly, the compression hub 10 may be viewed as consisting of alternate layers of compression plates 14 between which there are interposed layers of open space 24. The compression plates 14 are held in spaced apart relation relative to each other principally by virtue of their being secured to the beam means 16.

Figure 4:
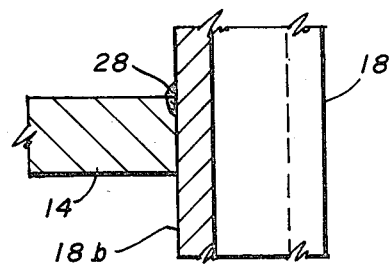
FIG. 4 is a cross-sectional view of a portion of the compression plate illustrated in FIG. 3 of a compression hub constructed in accordance with the present invention, taken substantially along the line 4—4 in FIG. 3.
Figure 5:
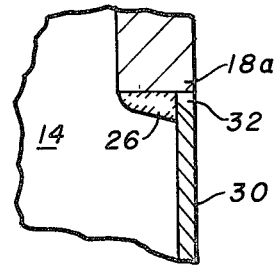
FIG. 5 is a plan view on an enlarged scale of a portion of the compression plate illustrated in FIG. 3 of a compression hub constructed in accordance with the present invention, illustrating the manner in which cooperating components are secured to the compression plate.

In accord with the preferred embodiment of the invention, the support beams 18, 20 or 22 of beam means 16 are fastened in place relative to the rabbet means of the compression plates 14 through welding. More specifically, as illustrated in FIGS. 3, 4 and 5 of the drawing, each of the support beams, be it support beam 18, support beam 20 or support beam 22, is welded to each of the compression plates 14 in the following manner. For example, in the case of support beam 18, the weld is made so as to extend the entire width of the side flanges 18a of the support beam 18 in the manner depicted in FIG. 5, and also along at least a portion of the rear surface 18b of the support beam 18 in the manner depicted in FIG. 4. The welds (only one shown in FIG. 5) made between the side flanges 18a of the support beam 18 and the compression plate 14 has been designated in FIG. 5 by reference numeral 26, and the weld made between the rear surface 18b of the support beam 18 and the compression plate 14 has been designated in FIG. 4 by reference numeral 28. In the event that either support beams 20 or support beams 22 are utilized with the compression plates 14, it is to be understood that these other forms of support beams would be welded to the compression plates 14 in the same manner as that described above for the support beams 18.

The compression plates 14 are all further interconnected together through the use of seal plate means comprising a multiplicity of seal plates 30. The seal plates 30 consist of integral members made of metal that are suitably secured in spaced relation to each other along the periphery of the compression plates 14. More specifically, as best understood with reference to FIGS. 2 and 3 of the drawing, a seal plate 30 is interposed between each adjacent pair of support beams, be they the support beams 18, the support beams 20 or the support beams 22. The seal plates 30 are each of sufficient length to extend the full height of the compression hub 10 as viewed with reference to FIG. 2 of the drawing. Preferably, the seal plates 30 are welded around their edges, i.e., the edges thereof which are located in juxtaposed relation to the support beams, be the latter the support beams 18, the support beams 20 or the support beams 22, and are also tack welded, as deemed desirable, to selected ones of the intermediate compression plates 14 of the compression hub 10. The seal plates 30, in addition to providing some limited support towards the maintenance of the compression plates 14 in spaced relation relative to each other, more importantly cooperate with the beams means 16 so as to provide a compression hub 10, which comprises a closed, fluid tight structure. It will be noted with reference to FIG. 3 that in accord with the illustrated embodiment of the invention, the compression hub 10 includes six seal plates 30. Also it will be noted that one of the welds by which the seal plates 30 are secured in position around the periphery of the compression plates 14 has been depicted in FIG. 5 of the drawing, and has been designated therein by the reference numeral 32. Finally, note should be taken of the fact that the welds, which are associated with the seal plates 30, have been omitted in FIG. 3 of the drawing in the interest of maintaining clarity of illustration therein.

For purposes of completing the description of the nature of the construction of the compression hub 10 in accord with the present invention, reference will once again be had to FIGS. 2 and 3 of the drawing. As was mentioned previously hereinabove, it is important that the compression hub 10 be susceptible to being cooled to the same relative temperature as the superconducting magnets 12 with which the compression hub 10 is designed to be cooperatively associated. To achieve this desired cooling of the compression hub 10, the latter, as best understood with reference to FIGS. 2 and 3 of the drawing, is provided with cooling means 34. The latter cooling means 34 includes a central coolant header 36 and a multiplicity of smaller coolant headers 38, the latter being suitably located in spaced relation relative to each other around the circumference of the compression hub 10 so as to in effect form a ring of headers 38. The coolant headers 38, as seen in FIG. 2, are preferably all interconnected externally of the compression hub 10 in fluid flow relation by means of ring means 40.

In accord with the mode of operation of the compression hub 10, coolant is fed thereto through the coolant header 36 in a sufficient quantity to effect a flooding of the interior of the compression hub 10. In order to insure the flow of coolant throughout the compression hub 10, each of the compression plates 14, except for the uppermost and lowermost compression plates 14 of the compression hub 10, have formed therein a multiplicity of openings in a manner illustrated with respect to the compression plate 14 that is to be found depicted in FIG. 3 of the drawing. Namely, all of the intermediate compression plates 14 are provided with a relatively large central opening 42, which communicates fluidically with the coolant header 36 shown in FIG. 2, and a multiplicity of smaller openings 44 comprising six in number in accord with the illustrated embodiment of the invention, which communicate fluidically with the headers 38. The smaller openings 44 with which each of the intermediate compression plates 14 is provided are preferably arranged relative to each other so that the spacing therebetween corresponds to the same spacing, which exists between the coolant headers 38 shown in FIG. 2. It is to be understood that although only three such coolant headers 38 are visible in FIG. 2, the compression hub 10 is preferably provided with a total of six such headers 38. Moreover, it to be understood that the uppermost compression plate 14 of the compression hub 10, as viewed with reference to FIG. 2 of the drawing, is provided with suitable means (not shown) operable for securing the coolant header 36 and the coolant headers 38 thereto in fluid flow relation therewith, and means (not shown) in the form of openings similar to the openings 42 and 44 in the compression plate 14 of FIG. 3, which communicate with the headers 36 and 38 so that coolant is capable of flowing from the exterior of the compression hub 10 to the interior thereof through the central coolant header 36, and from the interior of the compression hub 10 to the exterior thereof through the coolant headers 38 and the ring means 40. Although it has not been illustrated in the drawing, it is to be further understood that the coolant header 36 is connected in fluid flow relation with a suitable source of coolant.

In accord with the illustrated embodiment of the invention, the compression hub 10 is preferably provided with a passive cooling system wherein the coolant is allowed to flow freely throughout the compression hub 10 simply as a consequence of having a sufficient quantity of coolant, such as liquid helium, provided to the compression hub 10 so as to effect a flooding thereof. However, it is also contemplated within the present invention that should the heat losses in the compression hub 10 become unacceptable, the compression hub 10 could, without departing from the essence of the invention, be provided with an active cooling system wherein pump means (not shown) of conventional construction would be employed to effect a circulation of the coolant throughout the compression hub 10. Such pump means (not shown) would be suitably connected in fluid flow circuit relation with the headers 38 and the ring means 40 so as to effect a pumping of the coolant therebetween and thereby as a consequence throughout the compression hub 10. As noted previously hereinabove, liquid helium is preferably employed as the coolant in the compression hub 10 because of the fact that liquid helium boils at a temperature of 4.2° kelvin, and the fact that the superconducting magnets 12 normally are designed to be operated within a temperature range of 4.2° to 4.9° kelvin.

Because of the very low temperature to which the compression hub 10 is required to be cooled, it is important that all of the various components embodied therein be located in close proximity to the path of flow of the coolant through the compression hub 10. The construction, which the compression hub 10 embodies in accordance with the present invention, enables this to be accomplished very effectively. Namely, when the compression hub 10 is flooded with coolant, the open spaces 24, which exist on either side of each of the compression plates 14 except for the uppermost and lowermost compression plates 14 as viewed with reference to FIG. 2 of the drawing, are filled with coolant. In addition, the openings 42 and 44 with which the intermediate compression plates 14 are provided are also filled with coolant. Consequently, it can be seen that the entire upper and lower surfaces of the intermediate compression plates 14 are exposed to the coolant. In addition, the intermediate areas of the compression plates 14 are effectively cooled by the coolant flowing through the openings 42 and 44. Similarly, the beam means 16 and the seal plates 30, except for the portions thereof which are in actual physical contact with the compression plates 14, are engaged by the coolant which fills the open spaces 24. To summarize, a major proportion of the surface areas of the compression plates 14, the beam means 16 and the seal plates 30 are all actually physically contacted by the coolant itself thereby promoting effective heat transfer therebetween, and also thereby enabling a total cooling of the compression hub 10 to the desired temperature to take place.

Not only does the construction embodied by the compression hub 10 in accordance with the present invention enable the cooling thereof to be accomplished effectively and efficiently, but it also enables the cooling function to be performed without occasioning any deleterious effect on the structural adequacy of the compression hub 10 as a consequence thereof. As shown in FIG. 1 of the drawing, each of the superconducting magnets 12 is provided with a tongue-like portion 46, which projects outwardly therefrom a suitable distance. Each of the latter tongue-like portions 46 is suitably dimensioned so as to be capable of being received in supported relation thereto within the channel 48 with which each of the support beams 18, 20 and 22 is provided. More specifically, for this purpose the tongue-like portions 46 each embody a configuration that is complementary to the configuration of the channels 48.

The superconducting magnets 12 are cooperatively associated with the compression hub 10 through the interengagement of each of the tongue-like portions 46 of the magnets 12 with a respective one of the channels 48 provided for this purpose in the beam means 16. The forces being exerted by the superconducting magnets 12 tending to draw them together towards a common point are thus transmitted through the interengagement of the tongue-like portions 46 with the channels 48 to the latter and thereby to the compression hub 10. Sufficient strength is imparted to the compression hub 10 by virtue of the construction thereof wherein in accordance with the present invention, each of the compression plates 14 is securely welded to the beam means 16 and with additional strength being provided thereto by virtue of the securing also by welding of the seal plates 30 to the compression plates 14. Although not shown in the drawing, it is contemplated that the superconducting magnets 12 would also be suitably attached to the top and bottom portions, as viewed with reference to FIG. 2 of the drawing, of the compression hub 10 through the use of conventional fastening means (not shown). In accordance with the best mode of the invention contemplated by applicant, a compression hub 10 is provided that includes a multiplicity of compression plates 14 arranged in vertically stacked, spaced relation relative to each other whereby layers of open spaces 24 are established between pairs of adjacent compression plates 14. Each of the compression plates 14 is polygonal in configuration and has rabbet means formed in each of the side walls thereof. The rabbet means are suitably dimensioned so as to be capable of receiving therein in supported relation thereto beam means 16. Also there are seal plates 30 suitably attached to the periphery of the compression plates 14 whereby the seal plates 30 and the beam means 16 cooperate to form of the compression hub 10 a closed, fluid tight structure. The compression hub 10 is further provided with cooling or fluid flow means 34 in the form of a central coolant header 36, coolant headers 38 and ring means 40, which function collectively with the coolant openings 42 and 44 in the compression plates 14 to form a fluid flow path through the compression hub 10 for coolant. Finally, the superconducting magnets 12 are cooperatively associated with the compression hub 10 through the interengagement of the tongue-like portions 46 of the magnets 12 with the channels 48 formed in the beam means 16.

Thus, in accordance with the present invention there has been provided a novel and improved compression hub suitable for use in a fusion reactor system. The subject compression hub is particularly applicable to being cooperatively associated with the superconducting magnets that are employed in a fusion reactor for the purpose of effecting the magnetic confinement of plasma. In accordance with the preferred form of the invention, a compression hub has been provided, which embodies sufficient structural strength as to be capable of resisting the intense forces that are produced by the superconducting magnets and that tend to draw the superconducting magnets together to a common point. Further, the subject compression hub is characterized in the fact that it is also capable of being cooled to the same relative temperature as that of the superconducting magnets with which the compression hub is cooperatively associated thereby precluding the occurrence of any significant heat loss therebetween. In accordance with the present invention, a compression hub is provided wherein the coolant thereof is effected while at the same time the structural adequacy thereof is maintained. Finally, a compression hub had been provided in accord with the instant invention, which is readily capable of being manufactured and assembled.

While only one embodiment of my invention has been shown, it will be appreciated that modifications thereof, some of which have been alluded to hereinabove as for instance with reference to the configuration of the support beams, etc., may readily be made thereto by those skilled in the art. I, therefore, intend by the appended claims to cover the modifications alluded to herein as well as all other modifications, which fall within the true spirit and scope of my invention.

What is claimed is:

1. A compression hub, operable for use in resisting the forces tending to draw the magnets of a fusion reactor together towards a common point comprising:
   a. a multiplicity of compression plates, each of said multiplicity of compression plates having rabbet means formed in at least some of the side walls thereof, said multiplicity of compression plates being arranged in stacked relation relative to each other so that said rabbet means are aligned in parallel rows;
   b. beam means supported in said rabbet means, said beam means having means formed therein operable for effecting the interengagement of the compression hub with the magnets of the fusion reactor;
   c. securing means for fastening said beam means to said multiplicity of compression plates so as to cause said multiplicity of compression plates to be physically spaced one from another thereby establishing between each adjacent pair of said multiplicity of compression plates an open space, substantially co-extensive in dimensions to the dimensions defining the perimeter of one of said multiplicity of compression plates;
   d. seal plate means supported in juxtaposed relation to the periphery of said multiplicity of compression plates, said seal plate means cooperating with said beam means to form a closed, fluid tight structure of the compression hub; and
   e. fluid flow means embodied in the compression hub, said fluid flow means being operable to provide a fluid flow path for coolant through the compression hub.

2. A compression hub as defined in claim 1 wherein each of said multiplicity of compression plates comprises a six-sided polygon.

3. A compression hub as defined in claim 2 wherein each of said six sides of each of said multiplicity of compression plates has a rabbet means formed therein.

4. A compression hub as defined in claim 1 wherein said beam means comprises a plurality of support beams.

5. A compression hub as defined in claim 4 wherein said plurality of support beams corresponds in number to the number of said rabbet means formed in one of said multiplicity of compression plates.

6. A compression hub as defined in claim 5 wherein each of said plurality of support beams comprises an integral member having a length equal to the height of the compression hub.

7. A compression hub as defined in claim 4 wherein said securing means comprises welding means operable for welding each of said plurality of support beams to each of said multiplicity of compression plates.

8. A compression hub as defined in claim 1 wherein said means formed in said beam means comprises a channel.

9. A compression hub as defined in claim 1 wherein said seal plate means comprises a plurality of seal plates supported in spaced relation relative to each other around the periphery of said multiplicity of compression plates, each of said plurality of seal plates comprising an integral member having a length equal to the height of the compression hub.

10. A compression hub as defined in claim 1 wherein said fluid flow means includes a plurality of coolant headers mounted on the compression hub externally thereof, said fluid flow means further including means interconnecting said plurality of coolant headers with one another in fluid flow relation so as to establish a flow path for coolant therebetween.

* * * * *